Patented Nov. 15, 1927.

1,648,926

UNITED STATES PATENT OFFICE.

HEINZ MORITZ WUEST, OF BASEL, SWITZERLAND, ASSIGNOR TO THE HOFFMANN-LA ROCHE CHEMICAL WORKS, OF NEW YORK, N. Y., A CORPORATION OF NEW YORK.

PROCESS FOR THE MANUFACTURE OF WATER-SOLUBLE NEUTRAL DERIVATIVES OF DIHYDROXYDIAMINOARSENOBENZOL.

No Drawing. Application filed May 28, 1923, Serial No. 642,078, and in Switzerland June 3, 1922.

My invention relates to a process for the manufacture of water-soluble, neutral derivatives of dihydroxydiaminoarsenobenzol which consists in allowing dihydroxydiaminoarsenobenzol to react with aqueous solutions of aldoses of the disaccharose group and in precipitating the product thus obtained with a large excess of an organic fluid which mixes with water and does not dissolve the compound.

By allowing aldoses of the disaccharose group, such as lactose etc. to react with dihydroxydiaminoarsenobenzol, that is to say by placing the latter substance in a solution of the former and warming until reaction has taken place solutions of a light to deep yellow color are obtained. These solutions being poured into a large excess of methyl alcohol, ethyl alcohol, isopropyl alcohol, acetone and the like, the new compounds are separated from the solution as yellow precipitates which are easily filtered and by re-cleansing and drying may be obtained in pure form. The new compounds may also be obtained by using the salts of dihydroxydiaminoarsenobenzol as starting material, and instead of the pure aldoses mixtures of aldoses and ketoses may be used. In such cases the reaction affects only such sugars as contain a free aldehyde group.

The compounds of dihydroxydiaminoarsenobenzol are light yellow to greenish-yellow, non-hygroscopic powders which dissolve easily in water, the reaction being neutral. When preserved at a temperature below 20° C. in air-tight containers, their color but slightly changes within several weeks; at 37° C. however they become discolored in about two days; in the course of 8 to 10 days the solutions become dark brown and dense. The same decomposition takes place upon heating the solutions for half an hour in a boiling water-bath.

The following properties prove that the products are new compounds and not mere physical mixtures. The aqueous solutions of the new compounds produce no precipitate either with hydrochloric acid or with a solution of sodium hydroxide. When heated with hydrochloric acid, the compound is split into its components and on being neutralized with a solution of sodium hydroxide free dihydroxydiaminoarsenobenzol in the form of a thick precipitate is obtained; this precipitate is soluble in an excess of a solution of sodium hydroxide. If for instance a freshly prepared, greatly diluted solution of the new compound is diazotized and a diluted solution of phloroglucin added thereto, the yellow diazo-solution hardly changes color. If, however, before diazotizing, the solution has been heated with hydrochloric acid, the well known intense red coloring is obtained on coupling the diazo-solution with phloroglucin. The addition of diluted sulphuric acid causes no precipitate; if, however, the solutions are heated with sulphuric acid and then cooled, the insoluble sulphate of dihydroxydiaminoarsenobenzol forms a yellow precipitate.

Owing to the protected amino groups the compounds and their aqueous solutions are, compared with other arsenobenzol derivatives, very stable against air oxidation. The solid products are, in contrast to the solutions, absolutely stable in air-tight containers; even after long preservation in a tropical temperature there is no increase of toxicity.

On testing the toxicity on mice, rats and rabbits it was found that the new compounds are surprisingly non-toxic; their toxicity is, compared with the starting material, many times reduced. For instance, a white mouse will not tolerate more than 182 mgr. per kilo body weight of dihydroxydiaminoarsenobenzol by intravenous injection (Kolle, Deutsche Medizinische Wochenschrift, 1918, page 1180); Ehrlich-Hata and Castelli mention even lower doses. On the other hand, more than 2000 mgr. per kilo body weight of the compound of dihydroxydiaminoarsenobenzol and 2 molecules of lactose are tolerated without producing symptoms of intoxication. Notwithstanding the greatly reduced toxicity the therapeutic efficiency of the new compounds is not diminished, on the contrary, owing to the easy splitting up of the new molecule in the organism, they have the characteristic curing effect of dihydroxydiaminoarsenobenzol alike on animals infected with spirilla and trypanosoma and on syphilitic human beings. The aqueous solutions of the new compounds may be administered by hypodermic, intramuscular and intravenous injection without causing any irritation; especially the intravenous injection is absolutely free from those accompanying symptoms known as shock.

*Example.*

8 gravimetrical parts of dihydroxydiaminoarsenobenzol are lightly warmed on the water-bath with a solution of 18 gravimetrical parts of lactose in 40 parts of water, until entire solution has taken place. After cooling 25 volumetrical parts of absolute alcohol are added to the clear yellow solution while stirring. The solution thus obtained is poured in a fine jet into 350 volumetrical parts of absolute alcohol, the stirring being continued vigorously. After a few minutes continued stirring the precipitate is separated from the alcoholic fluid. The light yellow sandy precipitate may be cleansed with ether and is then dried under exclusion of air.

I claim:

1. As new products the water-soluble, neutral derivatives of dihydroxydiaminoarsenobenzol which may be produced by allowing dihydroxydiaminoarsenobenzol to react with an aqueous solution of lactose, the aqueous solutions of such products producing no precipitate either with hydrochloric acid or with a solution of sodium hydroxide, their diazotized diluted solution coupled with a dilute solution of phloroglucin hardly changing color, the solid products being absolutely stable in airtight containers, the toxicity of the new compounds, compared with other arsenobenzol derivatives, being many times reduced, their therapeutic efficiency being however undiminished.

2. The process for the manufacture of water soluble neutral derivatives of dihydroxydiaminoarsenobenzol which consists in placing dihydroxydiaminoarsenobenzol in an aqueous solution of lactose, warming the solution until reaction takes place and precipitating the product thus obtained with a large excess of an organic fluid which mixes with water and does not dissolve the compound.

3. The process for the manufacture of water soluble, neutral derivatives of dihydroxydiaminoarsenobenzol which consists in placing dihydroxydiaminoarsenobenzol in an aqueous solution of lactose, warming the solution until reaction takes place and precipitating the product thus obtained with a large excess of absolute alcohol.

4. As new products the water-soluble, neutral derivatives of dihydroxydiaminoarsenobenzol which may be produced by allowing dihydroxydiaminoarsenobenzol to react with the aqueous solution of an aldose of the disaccharose group and by precipitating the product thus obtained with a large excess of an organic fluid which mixes with water and does not dissolve the compound, the aqueous solutions of such products producing no precipitate either with hydrochloric acid or with a solution of sodium hydroxide, their diazotized diluted solution coupled with a dilute solution of phloroglucin hardly changing color, the solid products being absolutely stable in air-tight containers, the toxicity of the new compounds, compared with other arsenobenzol derivatives, being many times reduced, their therapeutic efficiency being however undiminished.

5. The process for the manufacture of water-soluble, neutral derivatives of dihydroxydiaminoarsenobenzol which consists in placing dihydroxydiaminoarsenobenzol in a solution of an aldose of the disaccharose group, warming the solution until reaction has taken place and precipitating the product thus obtained with a large excess of an organic fluid which mixes with water and does not dissolve the compound.

In witness whereof I have hereunto set my hand.

HEINZ MORITZ WUEST.